(12) United States Patent
Arnold

(10) Patent No.: US 6,665,604 B2
(45) Date of Patent: Dec. 16, 2003

(54) CONTROL METHOD FOR VARIABLE GEOMETRY TURBOCHARGER AND RELATED SYSTEM

(75) Inventor: Steven Don Arnold, Ranchos Palos Verdes, CA (US)

(73) Assignee: Honeywell International Inc., Morristown, NJ (US)

( * ) Notice: Subject to any disclaimer, the term of this patent is extended or adjusted under 35 U.S.C. 154(b) by 17 days.

(21) Appl. No.: 10/068,322

(22) Filed: Feb. 5, 2002

(65) Prior Publication Data

US 2003/0149522 A1 Aug. 7, 2003

(51) Int. Cl.[7] .................. F02B 37/24; G06F 17/00
(52) U.S. Cl. .................. 701/100; 701/99; 60/600; 60/602
(58) Field of Search .................. 701/100, 99; 60/600, 60/602, 605.1, 605.2, 608; 123/568.16

(56) References Cited

U.S. PATENT DOCUMENTS

| | | | |
|---|---|---|---|
| 4,671,068 A | * 6/1987 | Moody et al. | 60/602 |
| 4,776,168 A | * 10/1988 | Woollenweber | 60/602 |
| 6,058,707 A | 5/2000 | Bischoff | 60/602 |
| 6,067,798 A | 5/2000 | Okada et al. | 60/602 |
| 6,067,799 A | 5/2000 | Heinitz et al. | 60/602 |
| 6,067,800 A | 5/2000 | Kolmanovsky et al. | 60/602 |
| 6,089,018 A | 7/2000 | Bischoff et al. | 60/602 |
| 6,134,888 A | 10/2000 | Zimmer et al. | 60/600 |
| 6,134,890 A | 10/2000 | Church et al. | 60/602 |
| 6,161,383 A | 12/2000 | Aschner et al. | 60/602 |
| 6,161,384 A | 12/2000 | Reinbold et al. | 60/602 |
| 6,233,934 B1 | 5/2001 | Church et al. | 60/602 |
| 6,256,993 B1 | 7/2001 | Halimi et al. | 60/608 |
| 6,269,642 B1 | 8/2001 | Arnold et al. | 60/602 |
| 6,272,859 B1 | 8/2001 | Barnes et al. | 60/602 |
| 6,314,736 B1 | 11/2001 | Daudel et al. | 60/602 |
| 6,338,250 B1 | 1/2002 | Mackay | 60/612 |
| 6,397,597 B1 | 6/2002 | Gartner | 60/605.2 |
| 6,523,345 B2 | 2/2003 | Scherngell et al. | 60/602 |

FOREIGN PATENT DOCUMENTS

| | | |
|---|---|---|
| EP | 0786589 A | 7/1997 |
| WO | WO 0155575 A | 8/2001 |
| WO | WO 0159275 A | 8/2001 |
| WO | WO 0175292 A | 10/2001 |

* cited by examiner

Primary Examiner—Tan Q. Nguyen
(74) Attorney, Agent, or Firm—Ephraim Starr

(57) ABSTRACT

Control method for variable geometry turbocharger and related system are disclosed, wherein a boost target for a turbocharger is determined. Next, an error value between target boost and actual boost pressure is calculated and utilized to determine a new vane position. For example, the new vane position can be determined by calculating a needed change in vane position from the equation, $\Delta^\theta = k_p (err) + k_d \cdot d(err)/dt$, where $\Delta^\theta$ is the change in vane position, $k_p$ is a proportional gain value, $k_d$ is a differential gain value, and err is the error value between the boost target and the actual boost. A new vane position for the turbocharger is then determined by summing $\Delta^\theta$ with the previous vane position, and the turbocharger's set of vanes is positioned according to the new vane position. An open loop diagnostic mechanism and a feed-forward mechanism can also be employed to enhance vane positioning.

12 Claims, 1 Drawing Sheet

CONTROL METHOD FOR VARIABLE GEOMETRY TURBOCHARGER AND RELATED SYSTEM

BACKGROUND OF THE INVENTION

1. Field of the Invention

The present invention relates generally to the field of variable geometry turbine design and, more particularly, to method and system for controlling the vane position of a variable geometry turbocharger.

2. Related Art

Turbochargers are frequently utilized to increase the output of an internal combustion engine. A typical turbocharger comprises a turbine wheel coupled to a compressor wheel by a common shaft. Exhaust gas from the engine diverted into the turbocharger through an inlet nozzle spins the turbine wheel, which in turn spins the shaft and the compressor wheel. The spinning compressor wheel is able to force ambient air into the engine combustion chambers at a higher pressure than the engine can otherwise aspirate, resulting in what is commonly referred to as "boost pressure." In this manner, a larger air mass and fuel mixture is achieved in the engine, which translates to greater engine output during combustion. The gain in engine output is directly proportional to the increase in air flow generated by the turbocharger boost pressure. However, allowing the boost pressure to reach too high a level can result in severe damage to both the turbocharger and the engine, particularly when the engine has to operate beyond its intended performance range.

One of the primary objectives of turbocharger design is therefore to regulate boost pressure so as to optimize power output at different engine operating conditions without causing engine damage. A known technique for regulating boost pressure is the variable geometry turbocharger ("VGT") design. Two such VGT designs are the Garrett® VNT™ and AVNT™ designs, which use multiple adjustable vanes to control the flow of exhaust across the turbine wheel. Placed at the inlet nozzle, the vanes can be opened incrementally wider to permit greater gas flow across the turbine wheel, causing the turbine wheel to spin at a slower speed and lowering the boost pressure. Alternatively, the vanes can be closed incrementally narrower to raise the boost pressure. Thus, the amount of boost pressure generated by the turbocharger can be regulated by varying the vane position so as to optimize engine output, whether for fuel economy, emission, or response, while avoiding engine or turbocharger damage.

Thus, there is an intense need in the art for system and method for controlling vane position of a variable geometry turbocharger.

SUMMARY OF THE INVENTION

The present invention discloses control method for variable geometry turbocharger and related system. According to the present invention, a boost target is determined for a turbocharger. For example, the boost target can be determined from a boost target map that contains desired boost pressure for different measured engine parameters such as engine speed and/or fuel quantity. The boost target may also be corrected based on the ambient pressure to prevent overspeeding the turbocharger in instances where the ambient pressure is too low, for example.

Next, an error value between the target boost and the actual boost pressure is calculated. The error value is then utilized to determine a new vane position that is needed in order to realize the boost target. In one embodiment, the new vane position is determined by first calculating a required change in vane position according to the equation, $\Delta^{\theta} = k_p (err) + k_d \cdot d(err)/dt$, where $\Delta^{\theta}$ is the change in vane position, $k_p$ is a proportional gain value, $k_d$ is a differential gain value, and err is the error value between the boost target and the actual boost. Following, $\Delta^{\theta}$ is summed with the "old" or previous vane position to determine the desired new vane position. Subsequently, the turbocharger's set of vanes is positioned according to the new vane position determined previously. The vanes can be positioned by an actuator, for example, that is driven by a signal from a digital-to-analog converter (D/A) configured to convert the new vane position into an analog signal.

In one disclosed embodiment, an open loop diagnostic mechanism can be employed, prior to positioning the turbocharger's vanes, wherein a target vane position is determined from an open loop map. Following, the difference in value between the new vane position and the target vane position is calculated and compared to a threshold fault value. If the difference in value is equal to, or exceeds the threshold fault value, an error signal can be sent to an engine control module to enter fault mode.

In one disclosed embodiment, a feed forward mechanism is utilized to enhance control prior to positioning the turbocharger's set of vanes. In one disclosed embodiment, a control system is assembled to realize the processes set forth above.

DETAILED DESCRIPTION OF THE INVENTION

Figure 1:
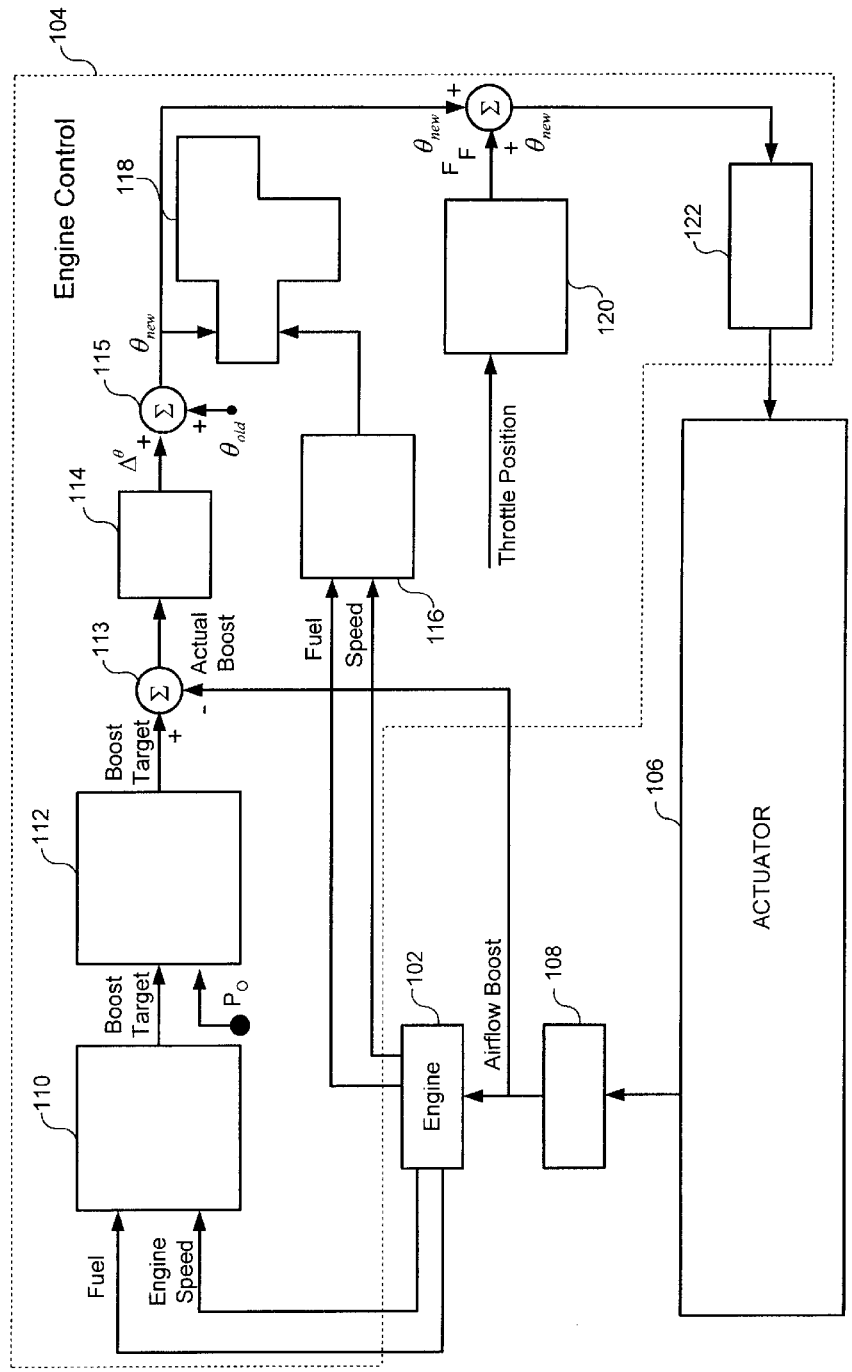
FIG. 1 illustrates a block diagram of an exemplary engine system in accordance with one embodiment of the invention.

The present invention is directed to control method for variable geometry turbocharger and related system. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed description are directed merely to exemplary embodiments of the invention. To maintain brevity, other embodiments of the present invention are not specifically described in the present application and are not specifically illustrated by the present drawings. It is appreciated that details not provided herein are known to those skilled in the art of turbocharger design.

FIG. 1 illustrates exemplary engine system 100 according to one embodiment of the invention, in which embodiment the vane position of a variable geometry turbocharger ("VGT") coupled to an internal combustible engine is innovatively adjusted. As shown, engine system 100 comprises internal combustible engine 102, engine control unit ("ECU") 104, actuator 106 and variable geometry turbocharger ("VGT") 108, which can be, for example, a Garrett® VNT™ or AVNT™ turbocharger. In the present embodiment ECU 104 comprises boost target map 110, boost target correcting module 112, Proportional/Integral/Differential ("PID") module 114, open loop map 116, fault detection module 118, feed forward module 120 and digital/analog ("D/A") converter 122.

Continuing with FIG. 1, VGT 108 can be a variable geometry turbocharger having a ring of adjustable vanes situated around its inlet nozzle, for example. The position of the vanes in VGT 108 is controlled by actuator 106, which can be configured to pivot the vanes incrementally to control the throat area of the inlet nozzle, and thereby, the amount of exhaust gas that flows into VGT 108. Actuator 106 can be an actuator of Any suitable design known in the art, for example, a position-dependent actuator design. A suitable actuator design is disclosed in U.S. Pat. No. 6,269,642 to Arnold, et al. Alternatively, in one embodiment, actuator 106 can be an electrical actuator with position feedback configured to communicate with ECU 104 as part of a Controller Area Network ("CAN"), which is a communication standard frequently used for in-vehicle control.

According to the present embodiment, sensors can be used to measure the quantity of fuel flow to engine 102, as well as the engine speed of engine 102, in a manner known in the art. It is noted that fuel quantity and engine speed are also referred to as "engine parameters" in the present application. The fuel quantity and engine speed measured by the sensors are fed into boost target map 110. Boost target map 110 can be a map stored in a memory component in ECU 104, for example, containing desired boost pressure for a given fuel quantity or engine speed. Based on the fuel quantity or engine speed, a boost target is determined from boost target map 110. In one embodiment, braking status can also be factored into the determination of the boost target.

The boost target is inputted into boost target correcting module 112, which also receives input from sensors measuring ambient pressure, $P_o$. One function of boost target correcting module 112 is to prevent the turbocharger, i.e. VGT 108, from overspeeding in instances where the ambient pressure is relatively low, such that meeting the boost target would overspeed the turbocharger. For example, boost target correcting module 112 can determine a maximum permissible boost as a function of the ambient pressure, the engine speed and the turbocharger speed limit. If the boost target determined from boost target map 110 exceeds the maximum permissible boost, then boost target correcting module 112 can reduce the boost target to a permissible level. In this manner, boost target correcting module 112 can be configured to adjust the boost target in instances where the boost target would result in overspeeding of the turbocharger.

The corrected boost target generated by boost target correcting module 112 is then compared to the actual boost at summing node 113 to determine the error between the boost target and the actual boost. The error value, which is also referred to as "err" in the present application, is fed into PID module 114. PID module 114 can be configured to determine a new vane position, $\theta_{new}$, to achieve the boost target utilizing a suitable PID filtering method known in the art. In one embodiment, rather than determining $\theta_{new}$ directly, PID module 114 can be configured to calculate the change in vane position, i.e. $\Delta\theta$, needed in order to meet the boost target. For example, PID module 114 can be configured to calculate $\Delta\theta$ according to equation 1, below:

$$\Delta\theta = k_p(err) + k_d \cdot d(err)/dt \qquad \text{Equation 1}$$

wherein "err" is the error value defined as the difference between the actual boost and the boost target as determined at summing node 113, and wherein $k_p$ is the proportional gain value and $k_d$ is the differential gain value determined in a manner known in the art. A new vane position, i.e. $\theta_{new}$, is then determined by summing $\Delta\theta$ and $\theta_{old}$ at summing node 115.

Once $\theta_{new}$ has been determined, other corrective/diagnostic mechanisms can be utilized to enhance the level of control. In one embodiment, an open loop diagnostic mechanism can be implemented wherein a target vane position, $\theta_{target}$, is determined from open loop map 116. Open loop map 116 can be, for example, a map stored in a memory component in ECU 104 that, based only on fuel quantity and engine speed, plots a desired vane position for different fuel quantities and engine speeds. ($\theta_{new}$ and $\theta_{target}$ can then be inputted into fault detection module 118, which can be configured to determine the difference in value between ($\theta_{new}$ and $\theta_{target}$ to generate $\theta_{diff}$. Fault detection module 118 can be further configured to compare $\theta_{diff}$ against a threshold fault value. If fault detection module 118 determines that $\theta_{diff}$ is equal to, or exceeds, the threshold fault value, for example, then fault detection module 118 can send an error message to a control module (not shown) in ECU 104 signaling ECU 104 to enter a fault mode.

In one embodiment, a feed forward mechanism can also be implemented subsequent to the determination of ° new. Feed forward module 120, which receives data on throttle position, can be configured to determine the feed-forward value ("FF") as a function of the absolute value of the change in throttle position ("TP"), a threshold value ("Y") and a constant value ("$K_a$") according to equation 2, below:

$$FF = (|dTP/dt| - Y) * K_a \qquad \text{Equation 2}$$

Alternatively, FF can be determined from the absolute value of the change in fuel flow, rather than throttle position.

Following, $\theta_{new}$ is fed into D/A converter 122 which can be configured to convert $\theta_{new}$ into an analog signal. In one embodiment, D/A converter 122 is a voltage driver configured to convert $\theta_{new}$ into a pulse code modulation ("PWM") signal. Alternatively, D/A converter 122 can be a current driver configured to convert $\theta_{new}$ into a dithered current. The signal from D/A converter 122 is then used to control the position of actuator 106.

In response to the signal from D/A converter 122, actuator 106 adjusts the vane position of VGT 108 to match $\theta_{new}$. In this manner, the vane position of VGT 108 can be controlled and adjusted, thereby controlling the flow of exhaust into VGT 108, and thereby controlling the level of boost pressure generated by VGT 108.

Next is described an exemplary VGT control method according to one embodiment, wherein the geometry of a turbocharger, e.g., a Variable Nozzle Turbocharger®, is adjusted. It is noted that the exemplary VGT control method described here can be implemented in an engine system such as engine system 100 in FIG. 1.

The exemplary VGT control method begins at a first step where the engine speed and/or fuel quantity are measured. The engine speed and fuel quantity can be measured using a suitable mean known in the art such as, for example, by way of a sensor. The measured engine speed and fuel quantity are inputted into an engine control unit, which can use either the engine speed or fuel quantity to determine a desired vane position for a VGT coupled to the engine.

Next, the measured engine speed and/or fuel quantity are used to determine a boost target for the turbocharger. The boost target can be determined, for example, from a boost target map stored in a memory component in the ECU containing desired boost levels for different engine speeds and fuel quantities. Subsequently, the boost target can be corrected, if necessary, at a subsequent step if it is determined that realizing the boost target would result in overspeeding the turbocharger. In such instance, the boost target may be reduced to avoid overspeeding the turbocharger.

After the boost target has been corrected, if necessary, the exemplary VGT control method continues to a following step where the error value, or "err," between the boost target and the actual boost is determined. The error value from this step is then used to determine a new vane position, $\theta_{new}$, for the VGT. The new vane position can be determined by using a suitable PID filter known in the art. Alternatively, $\theta_{new}$ can be determined by first calculating the change in vane position, i.e. $\Delta^\theta$, needed to realize the boost target. In one embodiment, $\Delta^\theta$ is determined according to equation 1, below:

$$\Delta^\theta k_p(err)+k_d \cdot d(err)/dt \quad \text{Equation 1}$$

wherein $k_p$ is a proportional gain value and $k_d$ is the differential gain value determined in a manner known in the art. Once $\Delta^\theta$ has been calculated, $^\theta$new can then be determined by summing $\Delta^\theta$ with the old vane position.

Following the determination of $\theta_{new}$, in one embodiment, the exemplary VGT control method includes a step whereat an open loop diagnostic mechanism is applied. For example, a target vane position, $\theta_{target}$, can be determined from an open loop map stored in a memory component in the ECU. The map can plot desired vane positions based only on fuel quantity and engine speed. The difference between $\theta_{new}$ and $\theta_{target}$ is then compared against a threshold fault value. If the difference between $\theta_{new}$ and $\theta_{target}$ is equal to, or exceeds, the threshold fault value, then an error message can be generated, for example, and the system can be triggered to enter a fault mode.

In one embodiment, following the determination of $\theta_{new}$, a feed-forward mechanism is applied at a subsequent step. A feed forward value, FF, can be calculated according to Equation 2, below:

$$FF=(|dTP/dt|-Y)^*K_a \quad \text{Equation 2}$$

wherein TP is the throttle position, Y is a threshold value and $K_a$ is a constant. In one embodiment, a fuel quantity measurement can be used in place of throttle position in Equation 2 to calculate FF.

Next, the signal representing the new vane position is converted to an analog signal. The signal can be converted, for example, by either a voltage driver or a current driver. The converted signal is then used at a subsequent step to set the actuator position, which in turn sets the vane position of the VGT. The vane position is set so as to achieve the boost target determined in earlier steps. The exemplary VGT control method may then return to the first step where the engine speed and fuel quantity are again measured, and the control loop can be repeated. In this manner, the geometry of the turbocharger, and more particularly the vane position of the turbocharger, can be controlled.

From the above description of the invention it is manifest that various techniques can be used for implementing the concepts of the present invention without departing from its scope. Moreover, while the invention has been described with specific reference to certain embodiments, a person of ordinary skills in the art would appreciate that changes can be made in form and detail without departing from the spirit and the scope of the invention. The described embodiments are to be considered in all respects as illustrative and not restrictive. It should also be understood that the invention is not limited to the particular embodiments described herein but is capable of many rearrangements, modifications, and substitutions without departing from the scope of the invention.

Thus, control method for variable geometry turbocharger and related system have been described.

What is claimed is:

1. A method for positioning a set of vanes of a variable geometry turbocharger, said method comprising steps of:

determining a boost target for said turbocharger;
calculating an error value between said boost target and an actual boost;
determining a change in vane position, $\Delta^\theta$, wherein said $\Delta^\theta$ is substantially equal to $k_p(err)+k_d \cdot d(err)/dt$;
determining a new vane position for said turbocharger based on said change in vane position;
positioning said set of vanes of said turbocharger according to said new vane position.

2. The method of claim 1 further comprising a step of correcting said boost target based on an ambient pressure so as to prevent overspeeding said turbocharger.

3. The method of claim 1 further comprising a step of measuring an engine parameter prior to said step of determining said boost target, wherein said boost target is determined from a boost target map based on said engine parameter.

4. The method of claim 1 further comprising a step of converting said new vane position into an analog signal after said step of determining said new vane position and prior to said step of positioning said set of vanes.

5. The method of claim 4 further comprising a step of utilizing said analog signal to position an actuator.

6. A method for positioning a set of vanes of a variable geometry turbocharger, said method comprising steps of:

determining a new vane position for said turbocharger;
modifying said new vane position with a feed forward value, FF, wherein said FF is substantially equal to $(|dTP/dt|-Y)^*K_a$;
positioning said set of vanes of said turbocharger according to said new vane position.

7. A system for positioning a set of vanes of a variable geometry turbocharger, said system comprising:

a boost target map for determining a boost target for said turbocharger;
an ECU configured to calculate an error value between said boost target and an actual boost and to determine a new vane position for said turbocharger based on a change in vane position
a PID module configured to determine said change in vane position, $\Delta^\theta$, wherein said $\Delta^\theta$ is substantially equal to $k_p(err)+k_d \cdot d(err)/dt$;
an actuator configured to position said set of vanes of said turbocharger according to said new vane position.

8. The system of claim 7 further comprising a boost target correcting module configured to correct said boost target based on an ambient pressure so as to prevent overspeeding said turbocharger.

9. The system of claim 7 further comprising:

a boost target map;
a sensor configured to measure an engine parameter, wherein said boost target is determined from said boost target map based on said engine parameter.

10. The system of claim 7 further comprising a D/A converter configured to convert said new vane position into an analog signal.

11. The system of claim 10 wherein said analog signal is utilized to position said actuator.

12. A system for positioning a set of vanes of a variable geometry turbocharger, said system comprising:

an ECU configured to determine a new vane position for said turbocharger;
a feed forward module configured to modify said new vane position with a feed forward value, FF, wherein said FF is substantially equal to $(|dTP/dt|-Y)^*K_a$;
positioning said set of vanes of said turbocharger according to said new vane position.

* * * * *